United States Patent [19]

Knittler

[11] Patent Number: 5,220,493
[45] Date of Patent: Jun. 15, 1993

[54] OVERRIDE CLOSED LOOP CONTROL OF SEVERAL CONTROLLED VARIABLES

[75] Inventor: Dietmar Knittler, Uttenreuth, Fed. Rep. of Germany

[73] Assignee: Siemens Aktiengesellschaft, Munich, Fed. Rep. of Germany

[21] Appl. No.: 793,400
[22] PCT Filed: Apr. 27, 1990
[86] PCT No.: PCT/EP90/00687
 § 371 Date: Jan. 13, 1992
 § 102(e) Date: Jan. 13, 1992
[87] PCT Pub. No.: WO91/01061
 PCT Pub. Date: Jan. 24, 1991

[51] Int. Cl.$^5$ ............................................. H02J 3/36
[52] U.S. Cl. ....................................... 363/35; 363/37; 363/51; 363/96
[58] Field of Search ..................... 363/34–37, 363/51, 79–81, 84–85, 87, 89, 95–96, 98

[56] References Cited

U.S. PATENT DOCUMENTS

| | | | |
|---|---|---|---|
| 4,264,951 | 4/1981 | Konishi et al. | 363/35 |
| 4,475,150 | 10/1984 | D'Atre et al. | 363/51 |
| 4,578,743 | 3/1986 | Inokuchi et al. | 363/35 |
| 4,626,978 | 12/1986 | Thouvenin | 363/79 |
| 4,649,466 | 3/1987 | Rogowsky | 363/51 |
| 4,680,692 | 7/1987 | Sakai | 363/37 |
| 4,727,467 | 2/1988 | Bendl et al. | 363/35 |
| 4,884,181 | 11/1989 | Kaufhold | 363/96 |
| 4,958,117 | 9/1990 | Kerkman et al. | 363/37 |
| 5,019,958 | 5/1991 | Varga et al. | 363/97 |

FOREIGN PATENT DOCUMENTS 0186849 7/1986 European Pat. Off. .
0197352 10/1986 European Pat. Off. .

OTHER PUBLICATIONS

IEEE Translations on Industrial Electronics, vol. 33, No. 3, Aug. 1986, New York, US, pp. 254–261; F. L. Luo et al.: *System Optimization—Self-Adaptive Controller for Digitally Controlled Thyristor Converters.*

Primary Examiner—Steven L. Stephan
Assistant Examiner—J. Sterrett
Attorney, Agent, or Firm—Kenyon & Kenyon

[57] ABSTRACT

Current converters of a high-voltage d.c. transmission system or other current-converter installations often require control loops for several controlled variables. Only one control loop thereby determines the delay angle, while the other control loops must be held ready to override this control loop in case of rapid changes in the operating state. According to the invention, the system deviations of all controlled variables are in fact acquired, and the controller parameters of a pre-programmed, general controlling structure are made available for each controlled variable. However, only one controller is available that has the preprogrammed, general controlling structure. This controller is always operative; however, it only interferes in the minimum value or the maximum value of the system deviations and, in each case, uses the controller parameters, which belong to the control loop activated at any one time.

8 Claims, 2 Drawing Sheets

OVERRIDE CLOSED LOOP CONTROL OF SEVERAL CONTROLLED VARIABLES

BACKGROUND OF THE INVENTION

The invention relates to a method for an override closed loop control of several controlled variables, whereby this override control works on the delay angle of a current converter, and to a device to this end.

To maintain a specific current in the operation of a current converter, it is sometimes necessary to have a current control with controller parameters (for example, the reset time TN and the proportional component KP of a PI (proportional-plus integral controller), which are adapted to the system. Often, secondary conditions must also be adhered to, for example if a specified extinction angle must not be undershot in the inverter operation, to avoid conduction-through, and/or when certain limiting values must be adhered to for the output voltage. As a manipulated variable, the current converter itself possesses virtually only the delay angle from which the firing pulses of its current-converter valves are derived. Therefore, to adhere to the secondary conditions, the transition must possibly be made from the current control to a corresponding closed-loop control of another internal state variable, whereby the closed-loop controls of these other internal state variables then require separate controller constants in each case.

Thus, if one wants to react to the various events in the operation of the current converter, it is customary in analog technology to set up parallel controllers and, by making an appropriate selection in each case, to only access one controller output, which then specifies the controlled variable for the delay angle of the current converter. The control loops of the controllers which are not operative in circuit are not closed thereby, so that their output signals would go up to the limit of the control modulation range, and when the controller is activated, a disproportionately long rise time would pass until the appropriate controlled variable can be optimally controlled. Therefore, the output signals from the controller must roughly match the delay angle of the current converter, in order to be able to intervene immediately in case of need.

A preferred field of application is the control of a high-voltage d.c. transmission between two stations A and B, linked in each case to a mains NA or NB, as depicted in FIG. 1.

One starts thereby from the assumption of an operating state, in which the current converter of station A works as a rectifier, and its delay angle $\alpha'$ specifies the firing pulses of the current converter GR by means of trigger equipment STA. In this manner, at the rectifier output, a direct voltage UdA is generated, and at a d.c. reactor, a direct current idA is generated. They are specified by suitable setpoint values (for example idA*). The control signal for the delay angle $\alpha'$ is therefore supplied in this operating state by a current regulator I-R', to which the system deviation idA*-idA is supplied via a linearizing element LIN'.

In station B, the current converter WR works as an inverter, which injects the dc current idB fed via a d.c. reactor and the corresponding d.c. voltage UdB via a transformer T2 into the a.c. system NB. TEL indicates a transmission line through which information is exchanged, for example concerning the setpoint value I* of the dc current exchanged between the two stations, the state of a release signal F for switching the entire system on or off, as well as concerning a signal GR/WR for the rectifier operation or the inverter operation of the two stations.

In the present operating state, in which WR is operated as an inverter, only values of $\alpha > 90°$ are provided for the delay angle $\alpha$, which lies according to definition between 0° and 180°. To avoid conduction-through, the extinction angle $\gamma$ must be smaller than the inverter stability limit, for example 150°. Since the reactive power can also be automatically controlled by means of the extinction angle, an extinction-angle controller $\gamma$-R is provided, which adjusts the delay angle $\gamma$ in dependence upon an operationally specified setpoint value $\gamma^*$ or the corresponding system deviation $\gamma^* - \gamma$.

If for reasons of temporary disturbances, the actual value idB of the injected dc current should lie below the setpoint value I* by a specified marginal value imarg below the setpoint value I*, then the extinction-angle control is supposed to be overridden by a current control. However, if the voltage UNB of the mains NB should rise above a specified limiting value UNB*, then the reactive load of the transmission length is supposed to be increased by reducing the delay angle, in other words transition is supposed to be made to a voltage control.

FIG. 1 depicts a measuring device MU for acquiring the voltage UNB, which works on a voltage regulator U-R. The corresponding measuring elements for the actual values of idB and $\gamma$ are not depicted, however a linearization element is shown, respectively with LIN1 and LIN2, with which a linear correlation is achieved between the system deviations $\gamma^* - \gamma$ of the $\gamma$-controller or (I*-imarg-idB) of the corresponding current regulator I-R and the prevailing output variable of this controller.

From the output signals of the three controllers $\gamma$-R, I-R and U-R, a selection element "Minimum$\gamma$" chooses the signal belonging to the smallest delay angle $\gamma$. In this manner, the delay angle is controlled to the value which is closest to 90°. The controllers themselves are operated in a way that enables them, in case of an open control loop, to supply a delay angle near the inverter stability limit. However, if the transition from the control to a U-control or an I-control is supposed to be made quickly, then the controllers, which each have an integral component, should be tracked, so that their output signals do not deviate considerably from the output signal of the $\gamma$ controller in operation. This is achieved in that the controllers have inputs for limiting values and the controller outputs are limited in each case to this limiting value The limiting value is stipulated thereby by a slight shift in the delay angle $\alpha$ by a specified differential angle $\Delta\phi$.

By tracking the controller limitations in this manner, one ensures that the current regulator or the voltage regulator can quickly become operative in case of temporary disturbances.

Thus for every controlled variable in question, such a system requires a separate controller, whose controller constants are adapted to the system and whose output signal must be properly tracked. The expenditure of time and energy that this requires, increases accordingly, when still other controlled variables are supposed to be included in the specific control concept.

Generally, digital control systems can perform control tasks very precisely, however the computing time required to implement the control task between the time the actual values are sampled and the time the control signals are calculated acts as a dead time. Often, this cannot be tolerated given the computing speed of available computers.

SUMMARY OF THE INVENTION

The present invention overcomes this shortcoming of the prior art, providing a simpler structure for this type of override control, which can be realized in particular by means of digital computers with their limited computing speeds. A method is provided for overriding closed loop control of several controlled variables. The override control works on the delay angle of a current converter. According to the method the system deviations of all controlled variables are acquired. The controlled variable to be made operative is identified and its system deviation is selected. The selected system deviation is transmitted to the input of a controller element. Controller constants belonging to the identified controlled variable are selected from specified controller constants and are input into the controlling element. That element forms a controlled variable for the delay angle of the converter from the selected system deviation and the selected controller constants.

A corresponding device includes: devices for sampling a system deviation of all controlled variables; a storage device in which a set of corresponding controller constants is stored for each controlled variable; and a controlling device connected at its inputs to the sampling and storage devices and which makes available a controlled variable for the delay angle at its output. The controlling device selects a minimum or maximum value from the sampled system deviations and forms a signal for identifying the controlled variable. The controller variables corresponding to the identified controlled variable are read out from the storage device. In a controlling unit, which has a stipulated controller structure with indefinite controller constants, the selected controller constants are input as values of the indefinite controller constants, and the controlled variable is formed in dependence upon the selected value of the sampled system deviations.

DETAILED DESCRIPTION

Figure 1:
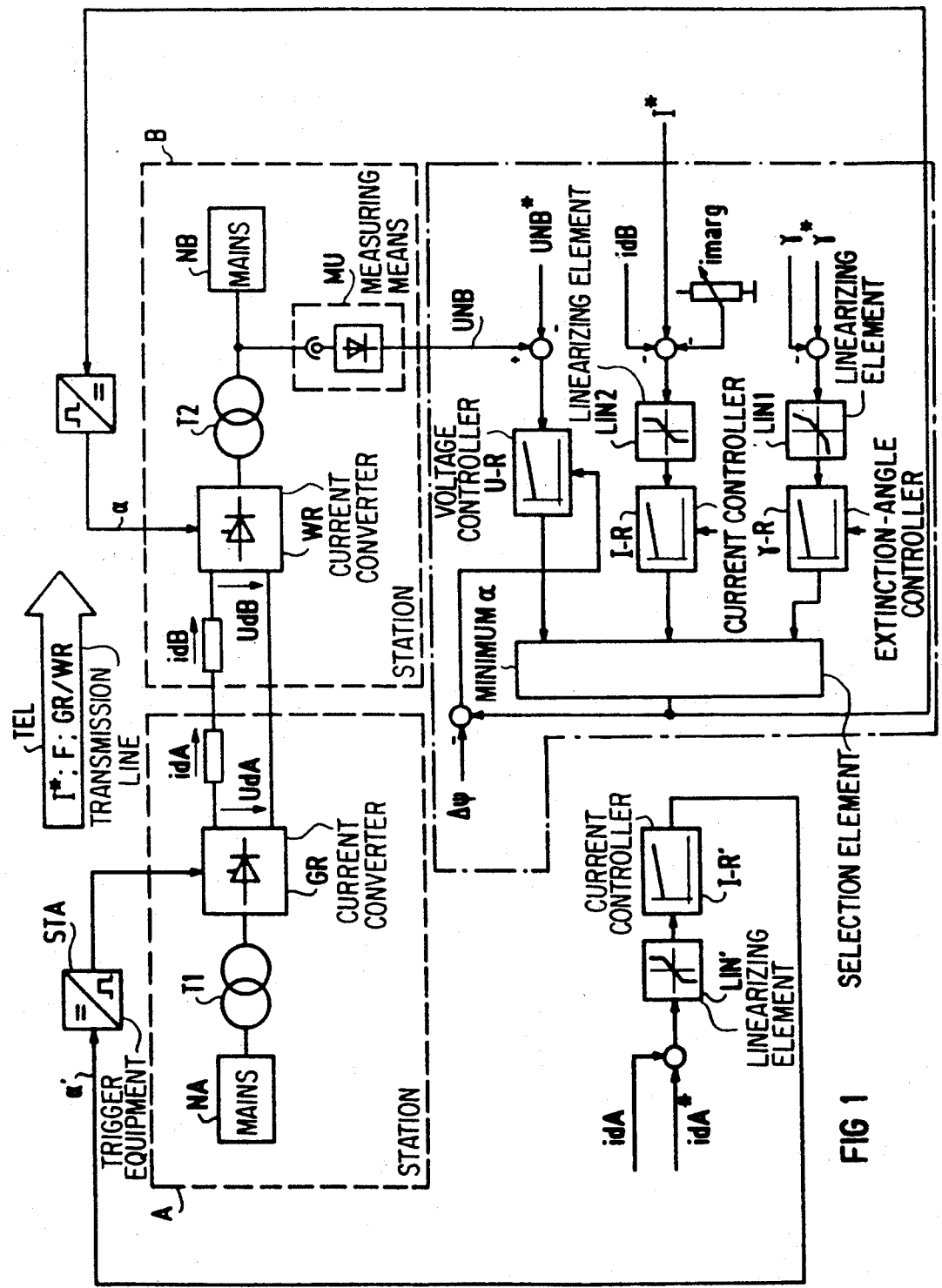
FIG. 1 depicts the preferred field of application of the present invention, i.e., control of a high-voltage d.c. transmission between two stations A and B, which are linked to a mains NA or NB.

One starts from the assumption that the performance quantities $\gamma$, idB, UdB and UNB should be considered as controlled variables, whose actual values are sampled in parallel by means of appropriate analog-digital converters A/D. The corresponding system deviations from the nominal values $\gamma^*$, $i^*$ (or $I^*$-imarg), UdB*, UnB* can be read out serially, for example. An additional nominal value Ustart is provided thereby, to be able to build up the direct voltage again by specifying a running-up or starting nominal voltage value when powering up the system (or possible also after a temporary absence of current in the system).

The computing time of a computing element PI, which is available to realize a proportional/integral controller and which must be programmed with an appropriate control algorithm, is not considerably shorter than the maximum permissible dead time of the entire control system. Generally, therefore, for each of these control loops, a separate computing element would be required, whereby these computing elements must work in parallel. To simplify the degree of complexity of the hardware, however, one aspires to carry out the control algorithms sequentially.

At this point, the invention foresees selecting, by means of a selection element, from the read-in or input system deviations of the controlled variables, those controlled variables whose deviation in the existing operating state is critical and should be corrected. This is accomplished by means of a suitable maximum-value selection element MAX (or when the controller is designed accordingly, a minimum-value selection element), which therefore selects the maximum value of the acquired system deviations and identifies the controlled variable belonging to the selected system deviation. In the normal state under consideration, the input signal X1 of the $\gamma$ controller $\gamma - R$ in station B is greater than the input signals x2, ... x5, which are formed from the other system deviations.

If the roles of the rectifier operation and the inverter operation in the two stations are supposed to be exchanged, then this can be accomplished via the signal GR/WR by means of a changeover switch SW. The changeover switch is switched thereby from the position WR belonging to the inverter operation to the position GR. In the position GR, a value is specified to the input x1 of the maximum-value selection element which corresponds for example to 200% of the nominal value and consequently deviates so greatly from the normal value range of the inputs x1, ... x5, that the corresponding controlled variable $\gamma^*$ or its s deviation $\gamma^* - \gamma$ is not selected with certainty and the system switches through to the output of the selection element.

Thus of all the entered input variables xi, the maximum value MAX(xi) is applied to this output, while a corresponding identification signal i specifies the corresponding controlled variable (for MAX (xi)=x1, thus i=1).

The output signal i triggers a device, which selects from the indicated controller constants, the controller constants belonging to the selected controlled variable. This is achieved in that, for example with i=1, the proportional constant KP-$\gamma$ and the reset time TN-$\gamma$ read out in each case from a read-only memory MM through the inputs i=1 of the two multiplexers MUX' and MUX" and applied to the multiplexer outputs. For each control loop of the controlled variables, the read-only memories contain the appropriate controller constants of a proportional-integral controller.

The controller itself is only established in its fundamental structure. The controller is preferably programmed in the software of a microcomputer as an appropriate control algorithm, and its controller constants as well as upper and lower limiting values LIMh and LIMl are input into it in each case as input variables. The controller itself is consequently flexible and not fixed to a specific control loop. The controlled variable for the delay angle $\gamma$ is applied to the output of the controller.

Therefore, with this control concept, only one controller is needed, while other controlled variables can be incorporated at any time into the control concept by reserving or allocating other inputs on the selection element MAX and on the two multiplexers. The controller itself is always in operation, so that it is not necessary to track its output signal.

To reliably commutate the current between its valve arms, the current converter requires that the delay angle not exceed the inverter stability limit (for example 150°) and not fall below a certain minimum angle (for example 5°). This can be guaranteed by means of the two limiting values LIMh, LIMl, whereby it can also be taken into consideration, in addition, that the station operated as an inverter, for example, is not supposed to make the transition to rectifier operation, thus should not fall below $\gamma$, for example, the limiting value LIMl $=90°$. However, the limiting values can also be used in a simple way to observe other secondary conditions. For example, if only a small dc current idB is extracted from the transmission length and injected into the mains NB, then only a small overlap angle between the firing of the next valve and the extinction of the preceding valve is needed to commutate the current. Therefore, the delay angle $\gamma$ is close to the nominal extinction angle $\gamma^*$ specified by the inverter stability limit, whereby the voltage UNB rises. If such a rise in the system voltage is undesirable, then by shifting the delay angle in the direction of 90°, it can be achieved that the transmission length essentially acts as a reactive load for the mains NM and stabilizes the system voltage at lower valves. This corresponds to the transition to an open-loop control, that is the closed-loop control of the controlled variables is made inoperative, and the delay angle is specified in functional dependence upon a suitably selected nominal value or actual value.

Figure 2:
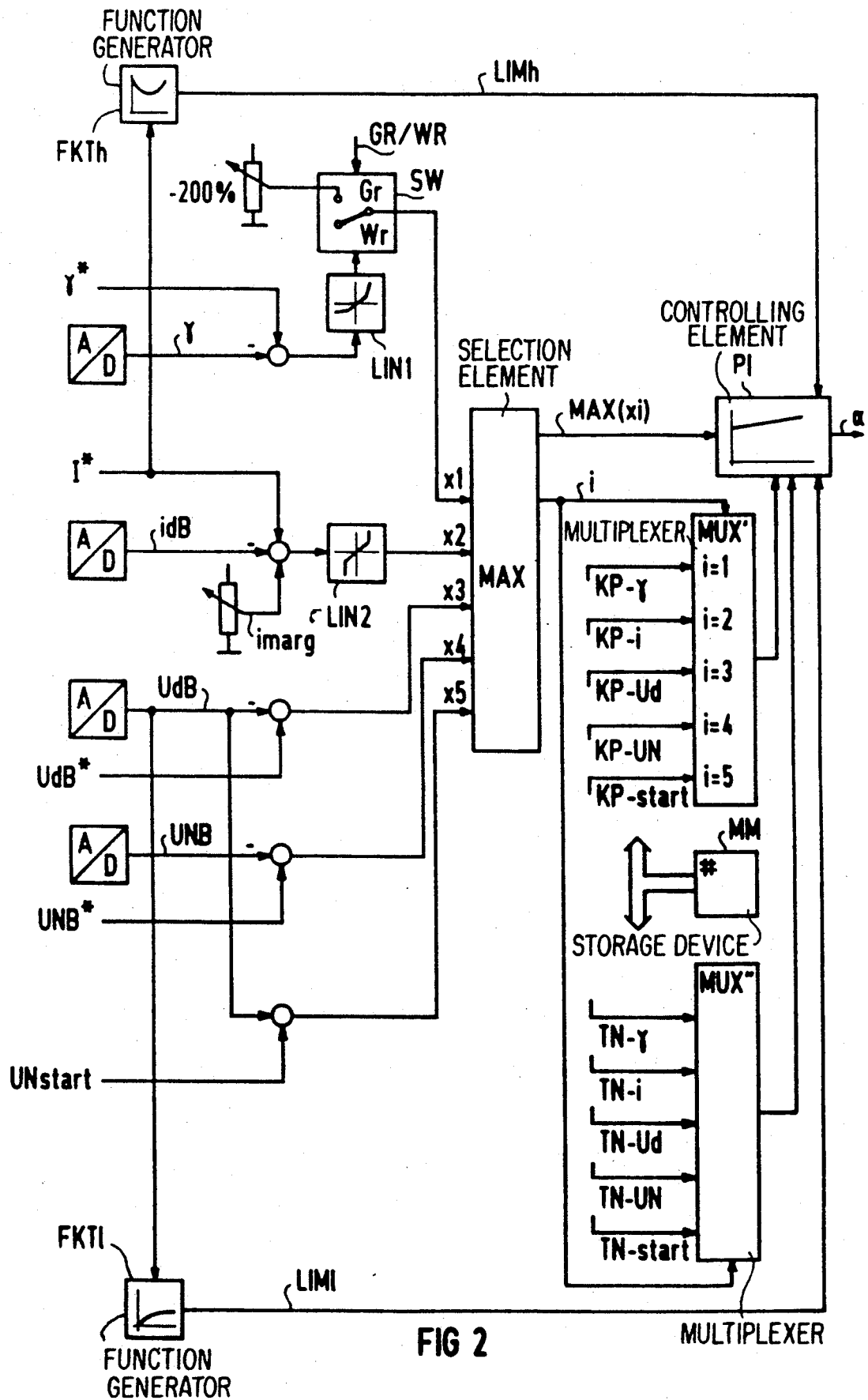
FIG. 2 depicts an embodiment of the present invention.

Such a transition is depicted in FIG. 2 by the two function generators FKTh and FKTI, which are fed by appropriate nominal values or actual values and which take the control loop of the selected controlled variable out of operation during operating states, in which the delay angle would exceed or fall below the values required to adhere to the mentioned secondary conditions. In this manner, the closed-loop control is automatically overridden by the open-loop control and vice versa.

Thus, the actual value of all controlled variables is sampled in this digital control at regular intervals whose duration is specified by the required response dynamics. This takes place preferably by means of parallel working analog-digital converters. At the beginning of each time interval, the system deviations of the controlled variables are read in (preferably serially). The selection of the selected system deviation and the determination of the controller parameters of the corresponding controlled variable can take place by means of hardware elements (MAX, MUX', MUX''); these elements can also be realized, however, in the software of the computer without significantly encumbering the computer. After selecting the system deviation and the controller parameters, the definite controller algorithm with the controller parameters belonging to the current operating state are established in the pre-programmed controller structure PI of the computer, and the automatically controlled control signal is calculated for the delay angle $\alpha$. The adherence to specified secondary conditions is monitored by inputting delay-angle limiting values, which are specified in functional dependence upon actual values or nominal values of selected operating variables.

The same controller structure is provided in both stations of the high-voltage d.c. transmission. Certain controlled variables, which are not supposed to be considered during the preceding operation as inverters or rectifiers, can be passed over in a simple manner, by replacing the system deviation of these controlled variables with implausible values, which are therefore eliminated when the system deviation to be brought into operation is selected.

This controller concept, however, is not only applicable to high-voltage d.c. transmission systems, but also to other open-loop control and closed-loop control systems of current converter devices.

What is claimed is:

1. A device for an override closed loop control of several controlled variables of a current converter installation, comprising
   a) a plurality of devices for sampling the system deviations of all controlled variables;
   b) a storage device, in which a set of corresponding controller constants is stored for each controlled variable; and
   c) a controlling device, which is connected with its inputs to the sampling devices and to the storage device, which at its output makes available a controlled variable for the delay angle, and which works according to the following algorithm:
   (1) the minimum value of a maximum value is selected from the sampled system deviations, and a signal for identifying the controlled variable is formed, whose system deviation is selected;
   (2) the controller constants belonging to the identified controlled variable are read out from the storage device; and
   (3) in a controlling unit, which has a stipulated controller structure with indefinite controller constants, the selected controller constants are input as values of indefinite controller constants, and the controlled variable is formed in dependence upon the selected value of the sampled system deviations.

2. The device according to clam 1, wherein said sampling devices contains parallel-working analog-digital converters, which make available in periodic intervals, in each case at the beginning of a period, digital values, which can be read out serially, for the difference between the sampled actual values and the specified nominal values of the controlled variables, and that the controlling unit of said controlling device comprises a digital computer, whose controller is pre-programmed with the indefinite controller constants.

3. The device according to claim 1, wherein the controlling unit contains means for limiting the delay angle to an input limiting value, and the controlling device contains means which form the limiting value according to a specified characteristic in dependence upon a nominal value or an actual value of the controlled variables.

4. A method for an override closed loop control of several controlled variables, whereby this override control works on a delay angle of a power converter, comprising the steps of:
   a) acquiring the system deviations of all controlled variables;
   b) according to a given criterion, identifying the controlled variable to be made operative and selecting the system deviation associated with the identified controlled variable from among the acquired system deviations;
   c) transmitting the selected system deviation to the input of a controller element;

d) selecting the controller constants belonging to the identified controlled variable from specified controller constants, which are each assigned to a controlled variable, and inputting the selected controller constants into the controlling element;

e) forming a controlled variable for the delay angle of the power converter at the controlling element from the selected system deviation and the selected controller constants;

f) the controlling element is always sustained in operation; and g) the acquired system deviation of a controlled variable, which is not supposed to be considered during the override closed control, is replaced by implausible values.

5. The method according to claim 4, wherein making a transition to an open-loop control comprises the steps of, inputting a limiting value into the controlling element, said limiting value depending on a specified characteristic of a performance quantity of the power converter, and limiting the controlled variable for the delay angle to this limiting value.

6. The method according to claim 4, further comprising the steps of specifying a controller structure with indefinite controller constants in the controlling element by programming an arithmetic unit; establishing a plurality of parameter values, which are assigned in each case to a controlled variable, for each indefinite controller constant; periodically sampling the actual values of the controlled variables, and formulating digital values at the beginning of each period for the difference between the sampled actual values from the specified nominal values of this controlled variable; selecting either the minimum value or the maximum value from the digital values, and forming an identification signal to identify the controlled variable belonging to the selected digital value; setting the indefinite controller constants to the selected controller parameters in the arithmetic unit by means of the identification signal; and controlling the delay angle of the current converter with the arithmetic unit in a way that enables the selected digital value to be corrected.

7. An application of the method according to claim 4 for the open-loop control of the current converters in a high-voltage d.c. transmission system.

8. An application of the method according to claim 4 in closed-loop control and open-loop control devices of the current converters for a high-voltage d.c. transmission system.

* * * * *